United States Patent [19]

Calvert

[11] 4,215,592
[45] Aug. 5, 1980

[54] REDUNDANT MOTOR DRIVE SYSTEM

[75] Inventor: John A. Calvert, New Market, Ala.

[73] Assignee: The United States of America as represented by the Administrator of the National Aeronautics and Space Administration, Washington, D.C.

[21] Appl. No.: 931,217

[22] Filed: Aug. 4, 1978

[51] Int. Cl.² .......................... F16H 37/06; F16H 1/16
[52] U.S. Cl. ....................................... 74/661; 74/425; 74/665 C; 318/15
[58] Field of Search ................. 74/661, 665 R, 665 Q, 74/665 P, 825, 390, 425, 458, 380, 665 A, 665 B, 665 C, 665 D, 665 E, 670, 426, 640; 310/83, 112, 114; 318/563, 15

[56] References Cited

U.S. PATENT DOCUMENTS

| | | | |
|---|---|---|---|
| 2,249,873 | 7/1941 | Webster | 74/661 |
| 2,366,734 | 1/1945 | Lear | 74/665 Q |
| 3,005,361 | 10/1961 | Meyding | 74/825 |
| 3,866,486 | 2/1975 | Lechner | 74/425 |
| 3,949,626 | 4/1976 | Berlinger, Jr. et al. | 74/665 A |
| 3,986,412 | 10/1976 | Farley | 74/661 |

Primary Examiner—Allan D. Herrmann
Attorney, Agent, or Firm—J. H. Beumer; J. R. Manning; L. D. Wofford, Jr.

[57] ABSTRACT

A drive system characterized by a base supporting a pair of pillars arranged in spaced parallelism, a shaft extended between and supported by the pillars for rotation about the longitudinal axis thereof, a worm gear affixed to the shaft and supported thereby in coaxial relation therewith. A bearing housing of a sleeve-like configuration is concentrically related to the shaft and is supported thereby for free rotation with respect thereto. A first and a second normally quiescent drive train, alternatively activatable, is provided for imparting rotation into said bearing housing. Each of the drive trains is characterized by a selectively energizable motor connected to a spur gear, a worm meshed with said worm gear and adapted to be driven by said spur gear, the motor of the first drive train being supported by said bearing housing in fixed relation therewith while the motor of the second drive train being mounted in fixed relation with the base, each gear train being adapted to simultaneously restrain said worm gear against rotation, independently of the other gear train, whereby the worm of each drive train is adapted to freeze the worm gear against motion, relative thereto, while the worm of the other drive train advances with respect to the worm gear for imparting rotation to the bearing housing.

5 Claims, 4 Drawing Figures

REDUNDANT MOTOR DRIVE SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention generally relates to redundant motor drive systems and more particularly to a redundant motor drive system characterized by two motors and separate gear trains, each being adapted to perform a driving function without backdriving the other.

2. Description of the Prior Art

The most pertinent prior art references noted during a preliminary search for the invention herein described and claimed are as follows:

| 3,214,999 | Lapp | Nov. 2, 1965 |
| 3,628,862 | Stephenson | Dec. 21, 1971 |
| 3,768,325 | Kucharski, Jr. | Oct. 30, 1973 |
| 3,866,486 | Lechner | Feb. 18, 1975 |
| 3,986,412 | Farley | Oct. 19, 1976 |

It is noted that U.S. Pat. No. 3,214,999 discloses a dual-stage drive comprising two motors which may be driven at different speeds to provide variable speeds or directions of rotation. However, this patent does not disclose a redundant drive means as disclosed and claimed in the instant application.

U.S. Pat. No. 3,628,862 is believed to be pertinent because it discloses two separate electric motors and two separate worm gear drives, with the worm gear on the output shaft of each motor being disposed in driving engagement with a sector worm. Selected energization of one or the other of the motors is arranged to angularly position a motor or reflector to a limited extent of the worm gear sector. However, this arrangement of drive means is not considered to constitute a redundant drive motor arrangement, as herein disclosed and claimed, but rather comprises a system which provides two motors for achieving different directions of rotation.

U.S. Pat. Nos. 3,768,325 and 3,866,486 are believed to be of general interest in that they show worm gear drives which block backdrive. Again, there is no disclosure of a system through which redundant operation is accommodated through multiple sets of independent motors and gear trains as is provided for through the instant invention.

U.S. Pat. No. 3,986,412 relates to a dual motor redundant drive system which employs separate planetary gear reducers and bearings differing structurally and functionally from the invention as hereinafter disclosed and claimed.

It will, of course, be appreciated that in many instances it is highly desirable to provide for redundancy, whereby back-up is always available. Such instances are frequently found in the aerospace industry wherein failure of a motor or system can severely jeopardize an otherwise successful mission. Of course, where multiple motors are employed for driving a common rotary output shaft it often is necessary to provide means for selectively coupling the motors with the shaft through a use of clutches and the like. This leads to complexity in design. Alternatively, backdriving one or more of the redundant motors has been resorted to, but such technique increases power requirements. In either instance, it can be seen that problems relating to excessive costs and complexity continue to plague designers of systems requiring a high degree of reliability.

It is therefore the general purpose of the instant invention to provide an improved and simplified redundant motor drive system which includes a plurality of motors, each being continuously interconnected and adapted to drive an output shaft without backdriving the other motor.

OBJECTS AND SUMMARY OF THE INVENTION

It is an object of the instant invention to provide an improved redundant motor drive system having an angular motion output.

It is another object to provide a redundant motor drive system particularly suited for angularly positioning optic systems and the like.

It is another object to provide in a redundant motor drive system an improved combination of gear trains, each being adapted to drive an output shaft without backdriving the other.

It is another object to provide in a redundant motor drive system an improved combination of gear trains, one of which is free to rotate with the output of the drive system while the other is fixed relative thereto.

Another object is to provide a redundant drive system which is particularly suited for use in angularly displacing optic systems, although not necessarily restricted in use therewith, since the drive system has utility in substantially any environment wherein redundancy in angular drive capability is desired.

These and other objects and advantages are achieved through the combination of a worm gear provided for angularly driving an output shaft for the system, and a pair of drive trains connected with the worm gear, one of the drive trains being mounted for rotation with the output shaft while the other is fixed, as will become more readily apparent by reference to the following description and claims in light of the accompanying drawings.

DESCRIPTION OF THE PREFERRED EMBODIMENT

Figure 1:
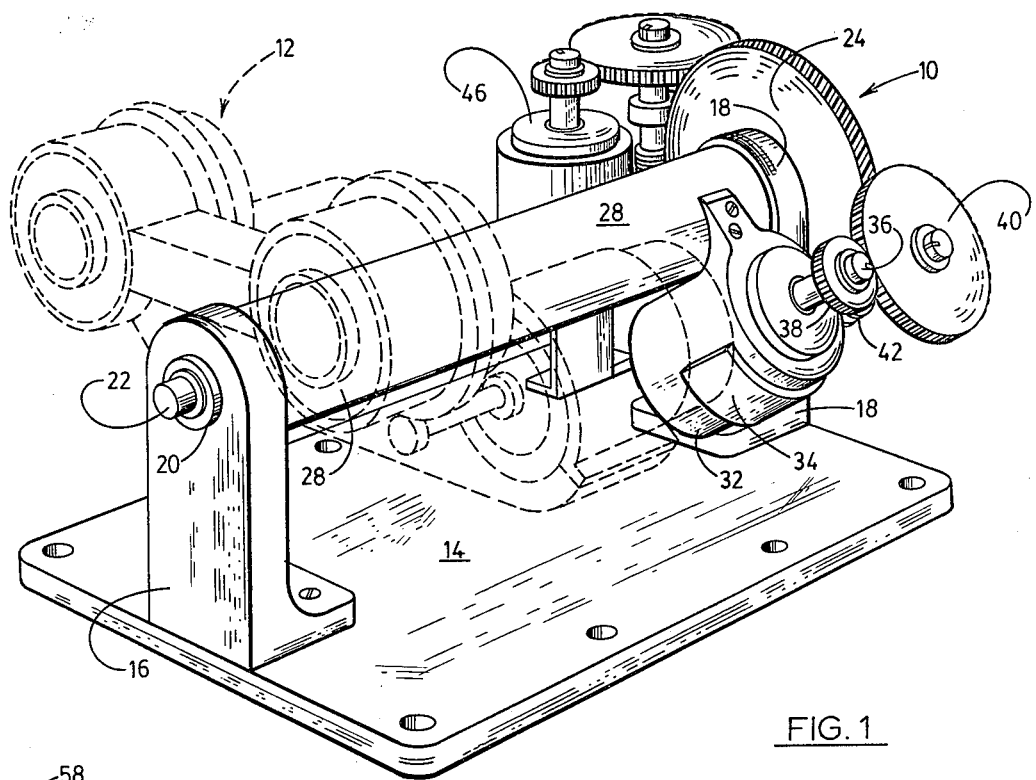
FIGS. 1 and 2 comprise alternate prospective views of a redundant motor drive system which embodies the principles of the instant invention.

Referring now with more particularity to the drawings, wherein like reference characters designate like or corresponding parts throughout the several views, there is shown in FIG. 1 a redundant motor drive system, generally designated 10, which embodies the principles of the instant invention.

As shown in the drawings, the system 10 is provided for positioning an optic system 12, shown in phantom. However, it is to be understood that the utility of the system 10 is not limited to orienting optics, and may be employed in combination with numerous other systems and devices requiring a redundant driving for assuring that an angular rate output is achievable on command.

As shown in the drawings, the system 10 includes a base 14 having mounted thereon a pair of vertically oriented support pillars 16 and 18. The pillars 16 and 18 are of any suitable design and are connected to the base plate 14 employing suitable fasteners such as screws, welds and the like.

It is important to note that the pillars 16 and 18 are extended normally from the plane of the base plate 14 in substantial parallelism. Hence, the pillars may be said to assume a vertical orientation in response to a horizontal orientation being important to the base.

Within the uppermost portion of each of the pillars 16 and 18 there is mounted a bearing race 20. The bearing race, in turn, receives an elongated shaft 22 and supports the shaft at its ends for free rotation about its longitudinal axis. The shaft 22 is supported against axial displacement through a use of suitable means including pins, lock rings and the like, not designated.

Affixed to the shaft 22, at one end thereof, there is a worm gear 24 of a disk-shaped configuration and characterized by peripheral teeth. The worm gear 24 is coaxially aligned with the shaft 22 and secured thereto employing suitable means such as keys, pins and the like, not shown.

Concentrically related to the shaft 22 there is a bearing housing 28 of a sleeve-like configuration, herein also referred to as an output shaft in view of its function. The bearing housing 28 is supported for free rotation relative to the shaft 22 by means including a plurality of annular bearing races 30 mounted on the shaft 22 and secured to the bearing housing 28 employing suitable fasteners, not designated. Thus the bearing housing 28 is supported for free rotation relative to the shaft 22 so that the bearing housing 28 may be rotated freely with respect to the shaft.

Mounted on the external surface of the bearing housing 28 there is a first drive train, as best illustrated in FIG. 1. This drive train includes an electrically energizable motor 32 of suitable design, adapted to be connected with a suitable source of electrical energy, not shown. The particular manner in which the motor 32 is secured to the bearing housing 28 is varied as desired. As shown, a bracket 34, of a cage-like configuration, is provided for receiving and supporting the motor 32. The bracket 34 is secured to the bearing housing 28 employing suitable fasteners, such as screws, welds and the like. The particular manner in which the bracket 34 is connected to the bearing housing 28 forms no part of the claimed invention and is varied as desired.

It will also be appreciated that the particular design of the motor 32 also is varied as desired. For example, in many instances, a reversible low-speed, high-torque dc motor is preferred. In any event, it should be appreciated that the motor 32 is of a convenient design and is characterized by a rotary output shaft 36 having affixed thereto a spur gear 38. The spur gear is, in turn, meshed with a spur gear 40 affixed to the shaft of a gear worm 42. The spur gear 40 is mounted on the shaft of the gear worm 42 employing any suitable means, including a key and keyway combination, where so desired. The gear worm 42 is meshed with the peripheral teeth of worm gear 24 in a manner such that in response to rotation being imparted to the gear worm 42, by the spur gear 38, the gear worm advances along the periphery of the worm gear, provided the worm gear 24 is secured in a stationary configuration in a manner which will hereinafter become more fully understood. Thus the bearing housing 28, or output shaft, is angularly displaced about the shaft 22. Of course, the motor 32, upon being de-energized serves to secure the gear worm 42 against rotation so that the worm gear 24, in effect, is directly coupled, in a fixed relationship, with the bearing housing 28 upon which the motor is mounted.

Figure 2:
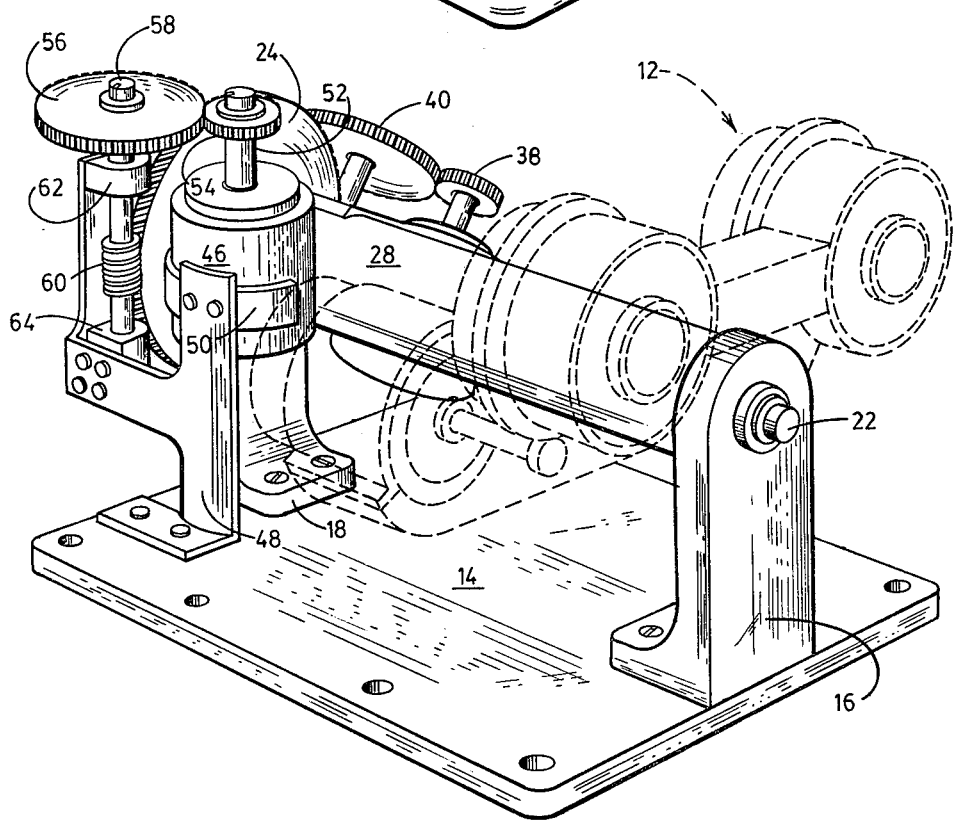
Figure 3:
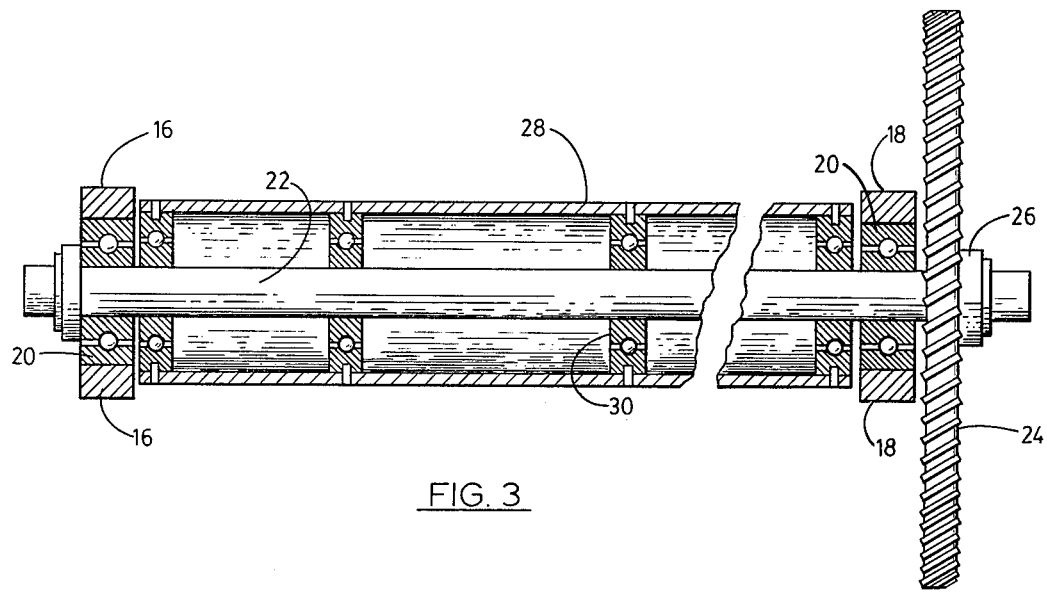
FIG. 3 is a cross sectional view of a bearing housing comprising a rotary output shaft for the system.
Figure 4:
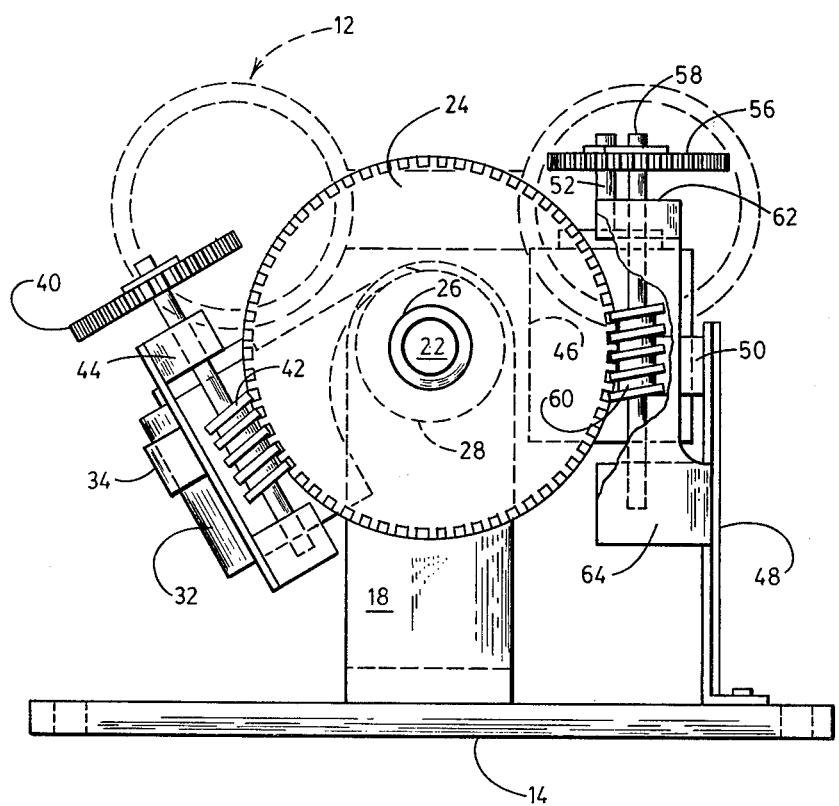
FIG. 4 is an end elevational view of the system.

As best shown in FIG. 2, there is provided another motor, designated 46. This motor is of a design and construction similar to the motor 32, and, in practice, is supported by an upright bracket 48. The bracket 48 is affixed to the base plate 14 in any suitable fashion while the motor 46 is secured thereto by a suitable band 50 mounted on the bracket 48. Again, the particular manner in which the motor 46 is mounted on the bracket 48, or the manner in which the bracket 48 is mounted on the base plate 14 forms no specific part of the instant invention and is varied as desired.

The motor 46, like the motor 32, is provided with a rotary output shaft, designated 52, having mounted thereon a spur gear 54. The spur gear 54 is meshed with another spur gear 56 rigidly affixed to the shaft 58 of another gear worm 60. The worm 60 is supported for rotation by bearing blocks 62 and 64 rigidly affixed to the bracket 48, in any suitable manner. The spur gears 54 and 56 are of course rigidly affixed to the shafts 52 and 58, respectively. In practice, the gears are coupled to the shafts in any suitable manner including lock rings, key and keyway couplings and the like not designated.

It is important to note, however, that the worm 60 also meshes with the worm gear 24. Hence, the motor 46, upon being de-energized serves to secure the worm gear against angular displacement, but upon being energized, serves to apply torque to the shaft 58 for driving the worm 60. As the worm 60 is driven torque responsively is applied to the worm gear 24, all in a manner well understood by those familiar with the operation of such gearing and couplings. The worm gear 24 being free to rotate about its axis is thus driven in rotation.

OPERATION

It is believed that in view of the foregoing description, the operation of the system herein described will readily be understood, however, it will be reviewed at this point in the interest of completeness.

With the system 10 assembled in the manner hereinbefore described, it is prepared for operation by connecting the motors 32 and 46 to suitable circuits controlled in any suitable manner, for achieving desired states of energization.

It is important to appreciate that the motor 32 is affixed to the bearing housing 98 and therefore is supported thereby to rotate therewith, along with the spur gear 40 and its associated gear worm 42. Additionally, it should be appreciated that the motor 46 along with the spur gear 56 and its associated gear worm 60 are supported in a rigidly affixed relationship with the base 14.

At this juncture it also is important to fully appreciate that one of the characteristics of a gear worm and worm gear coupling is that backdrive through the coupling is substantially impossible. Consequently, with the motor 32 in a quiescent state of energization, the worm gear 24 is secured against rotation relative to the bearing housing 28, while being free to rotate about its axis. Similarly, with the motor 46 in a quiescent state of energization, the worm 60 secures the worm gear 24 against rotation about its axis while the bearing housing is free to rotate relative to the worm gear 24. In other words, neither of the gear worms 42 or 60 can backdrive the worm gear 24, because of the effect of the other.

Consequently, with the motor 46 in a quiescent state of energization, energization of the motor 32 serves to drive the gear worm 42 causing the worm to advance about the periphery of the worm gear 24. Such advancement of the gear worm 42 serves to impart angular displacement to the bearing housing 28, about the shaft 22. Of course, where the motor 32 comprises a reversible motor angular displacement of the bearing housing 28 in opposite directions thus is accommodated.

With the motor 32 in a quiescent state of energization it is possible to impart rotation to the bearing housing 28 simply by energizing the motor 46 for driving the gear worm 60, via the spur gears 54 and 56. As the gear worm 60 is driven in rotation angular displacement is imparted to the worm gear 24 for thus causing the worm gear 24 to rotate about its axis for thus imparting simultaneous rotation to the bearing housing 28 coupled thereto through the gear worm 42.

In view of the foregoing, it should readily be apparent that the system 10 provides a practical solution to the problem of achieving motor redundancy, for a drive system, without requiring that the motors employed be back-driven.

I claim:

1. In a redundant motor drive system the improvement comprising:
   A. a base;
   B. a shaft mounted on said base and supported for rotation about the longitudinal axis thereof;
   C. a worm gear coaxially aligned with said shaft; and
   D. a pair of gear trains, each terminating in a gear worm meshed with said worm gear and characterized by a motor connected in driving relation with said worm, the motor for one gear train being mounted on said shaft and the motor for the other gear train being mounted on said base.

2. A redundant motor drive system having angular motion output comprising:
   A. a base;
   B. an elongated housing freely rotatable relative to said base;
   C. means including a worm gear adjacently related to said housing and supported for rotation relative thereto; and
   D. first and second normally quiescent, selectively activatable drive means, said first drive means being characterized by a motor mounted on the housing and connected with said worm gear for angularly displacing said housing when said second drive means is in a quiescent state, and said second drive means being characterized by a motor adjacently related to said housing and connected with said worm gear for angularly displacing said housing when said first drive means is in a quiescent state, each of said drive means including a motor driven gear worm meshing with said worm gear.

3. A drive system as defined in claim 2 wherein said motors are alternatively energizable, said first drive means in its quiescent state restrains said worm gear from rotation relative to said housing, and second drive means in its quiescent state restrains said worm gear from rotation about its own axis, and each of the motors is characterized by a rotary output shaft having a spur gear mounted thereon and connected in driving relation with a gear worm.

4. A redundant motor drive system particularly suited for use in angularly positioning an optic system about an axis of rotation comprising:
   A. a base including a pair of substantially vertically oriented pillars arranged in mutually spaced parallelism;
   B. a shaft extended between said pillars and supported thereby for rotation about an axis of rotation coincident with the longitudinal axis thereof;
   C. a worm gear affixed to said shaft in supported coaxial relation therewith;
   D. a bearing housing of a sleeve-like configuration concentrically related to said shaft and supported thereby for free rotation relative thereto; and
   E. first and second normally quiescent drive trains alternatively activatable for imparting rotation to said bearing housing, each of said drive trains being characterized by a selectively energizable motor having a rotary output shaft, a gear worm meshed with said worm gear and a pair of meshed spur gears connecting said gear worm to said output shaft, the motor of the first drive train being mounted on said bearing housing and supported thereby for rotation therewith, and the motor of said second drive train being mounted on said base in fixed juxtaposition with said bearing housing.

5. A redundant motor drive system as defined in claim 4 wherein said first drive train in its quiescent state secures said worm gear against rotation relative to said housing and said second drive train in its quiescent state secures said worm gear against rotation about its own axis of rotation.

* * * * *